United States Patent
Ma et al.

(10) Patent No.: US 9,024,879 B2
(45) Date of Patent: May 5, 2015

(54) COMPUTER INPUT DEVICE WITH SWITCHABLE OPERATION MODES AND MODE SWITCHING METHOD THEREOF

(71) Applicant: Giga-Byte Technology Co., Ltd., New Taipei (TW)

(72) Inventors: Mou Ming Ma, New Taipei (TW); Haw Kae Huang, New Taipei (TW); Tzu Chieh Lin, New Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 183 days.

(21) Appl. No.: 13/844,908

(22) Filed: Mar. 16, 2013

(65) Prior Publication Data

US 2014/0022173 A1    Jan. 23, 2014

(30) Foreign Application Priority Data

Jul. 17, 2012  (TW) .............................. 101125671 A

(51) Int. Cl.
  *G06F 3/033*   (2013.01)
  *G09G 5/08*    (2006.01)
  *G06F 3/023*   (2006.01)
  *G06F 3/0354*  (2013.01)

(52) U.S. Cl.
  CPC ............ *G06F 3/03543* (2013.01); *G06F 3/023* (2013.01)

(58) Field of Classification Search
  CPC .............................. G06F 3/033; G06F 3/0354
  USPC .................................. 345/156, 161, 163–167
  See application file for complete search history.

(56) References Cited

U.S. PATENT DOCUMENTS

| 8,199,107 | B2 * | 6/2012 | Xu et al. ........................ 345/158 |
| 2002/0133263 | A1 * | 9/2002 | Ouellet et al. ................. 700/180 |
| 2007/0109272 | A1 * | 5/2007 | Orsley et al. .................. 345/173 |
| 2010/0127983 | A1 * | 5/2010 | Irani et al. ..................... 345/163 |
| 2011/0273628 | A1 * | 11/2011 | Lee et al. ...................... 348/744 |
| 2013/0038534 | A1 * | 2/2013 | Krah et al. ..................... 345/163 |
| 2013/0127719 | A1 * | 5/2013 | Yasutake ....................... 345/163 |

FOREIGN PATENT DOCUMENTS

JP    A1999327762    11/1999

* cited by examiner

*Primary Examiner* — Ricardo L Osorio
(74) *Attorney, Agent, or Firm* — Chun-Ming Shih

(57) ABSTRACT

A computer input device with switchable operation modes includes a body, a printed-circuit-board (PCB), a processor, and two switches. Two function buttons are disposed on the body to be pressed to move back and forth; the PCB is disposed in the body; the processor and the switches are disposed on the PCB and electrically connected with each other. The processor outputs control signals corresponding to a first operation mode or a second operation mode to a computer. While the switches are respectively triggered by the pressing of the function buttons, triggering signals are transmitted to the processor simultaneously, so that the processor switches the first operation mode to the second operation mode; or the processor switches the second operation mode to the first operation mode.

8 Claims, 11 Drawing Sheets

COMPUTER INPUT DEVICE WITH SWITCHABLE OPERATION MODES AND MODE SWITCHING METHOD THEREOF

CROSS-REFERENCES TO RELATED APPLICATIONS

This non-provisional application claims priority under 35 U.S.C. §119(a) on Patent Application No. 101125671 filed in Taiwan, R.O.C. on 2012 Jul. 17, the entire contents of which are hereby incorporated by reference.

BACKGROUND

1. Technical Field

This disclosure relates to a computer input device, and more particularly to a computer input device with switchable operation modes and a mode switching method thereof.

2. Related Art

With the advancement of technologies, computers, such as personal computers and laptop computers, have become indispensable tools to the general public in their daily lives or work. Computer users must use input devices, such as keyboards, mice, trackballs, joysticks, and touchpads, to operate the computers. The most common input device is the mouse, which have become one of the indispensable peripheral devices.

Due to different needs, such as playing games, browsing the web, or drawing, etc, mice need to have the corresponding operating conditions, in order to get a better mouse control. In the common used operating system, the settings are in the operation mode that is suitable for right-handed people. The setting is convenient for the right-handed people, while it's not convenient for the left-handed people. Though left-handed mouse products are on sale on the market, the selection is less relative to other customized products due to the limited market demand.

In order to make the operation more intuitive for left-handed users, it is necessary to switch the operation modes of the left and right buttons on a mouse. The most common mode switching method is that adjusting the setting of the mouse in the operating system, so as to swap the functions of the mouse operating signals that are transmitted to the computer. In other words, if users want to switch the mouse operation mode, they adjust the setting of the mouse in the operating system, but the mouse operating signals themselves do not change.

However, this common mode switching method is time-consuming and inconvenient. Users must enter the setting interface of the operating system. There is a kind of mouse product for both left-handed and right-handed people. There is an operation mode switching button on the kind of mouse. If users want to switch the mouse operation mode, users press the button to switch the mouse operation mode.

However, the mode switching method of this kind of mouse is to transmit a triggering signal to the computer from the mouse, so as to swap the functions of the mouse operating signals that are transmitted to the computer, just like adjusting the setting of the mouse in the operating system, and the software or firmware of the mouse is not different from the common mice. The operating signals transmitted to the computer from this kind of mouse do not change; the switching of the operation mode still depends on the adjustment of the setting of the mouse in the operating system.

Besides, users can not adjust the operation mode of a specific mouse. When the same mouse is used in different computers, users need to adjust the settings of the mouse in the operating systems again, which is inconvenient for the actual needs.

SUMMARY OF THIS DISCLOSURE

In view of the above problems, this disclosure provides a computer input device with switchable operation modes and a mode switching method thereof, so as to solve the inconvenience about the switching of the mouse operation mode in the prior art.

The computer input device with switchable operation modes is electronically connected to a computer and includes a body, a printed-circuit-board (PCB), a processor, and two switches. The body includes two function buttons, and the two function buttons are able to be pressed back and forth with respect to the body. The PCB is disposed in the body, and the processor is electronically connected to the PCB. The processor outputs a first control signal corresponding to a first operation mode or a second control signal corresponding to a second operation mode to the computer. Two switches are disposed on the PCB, respectively correspond to the positions of the two function buttons, and are electrically connected to the processor.

While the two switches are respectively triggered by the pressing of the two function buttons, the two switches respectively generate and transmit a triggering signal to the processor. And when the processor receives the two triggering signals simultaneously, the processor switches the first operation mode to the second operation mode and outputs control signals corresponding to the second operation mode to the computer; or the processor switches the second operation mode to the first operation mode and outputs control signals corresponding to the first operation mode to the computer.

Corresponding to the above computer input device, this disclosure separately provides the mode switching method for operation modes. The mode switching method for operation modes applies to a computer input device and includes the following steps: pressing two function buttons simultaneously, so as to trigger two switches; generating and transmitting a triggering signal to a processor via the two switches respectively; and receiving the two triggering signals via the processor simultaneously, and then switching the computer input device to a first operation mode and outputting a control signal corresponding to the first operation mode to a computer via the processor; or switching the computer to a second operation mode and outputting a control signal corresponding to the second operation mode via the processor.

The processor in the computer input device of this disclosure can directly switch to the suitable operation mode, without repeatedly adjusting the settings of the mouse in the operating systems in different computers and depending on the adjustment of the setting of the mouse in the operating system, which is very convenient for users.

The detail of this disclosure can be better appreciated from the following detailed description of this disclosure, taken in conjunction with the attached drawings.

BRIEF DESCRIPTION OF THE DRAWINGS

This disclosure will become more fully understood from the detailed description given herein below for illustration only, and thus not limitative of this disclosure, wherein.

DETAILED DESCRIPTION OF THE DISCLOSURE

Figure 1A:
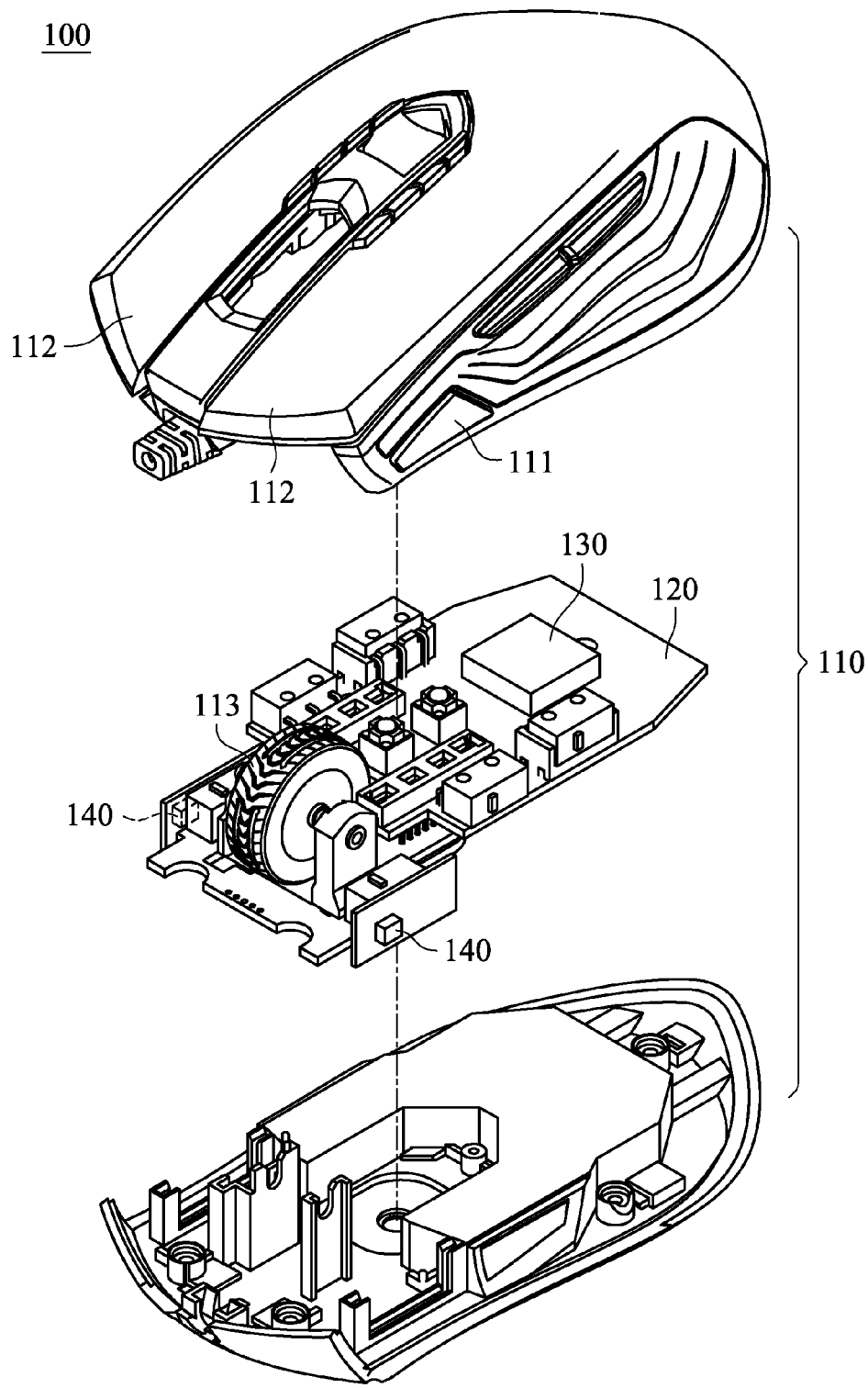
FIG. 1A is an exploded view of the computer input device according to a first embodiment.
Figure 1B:
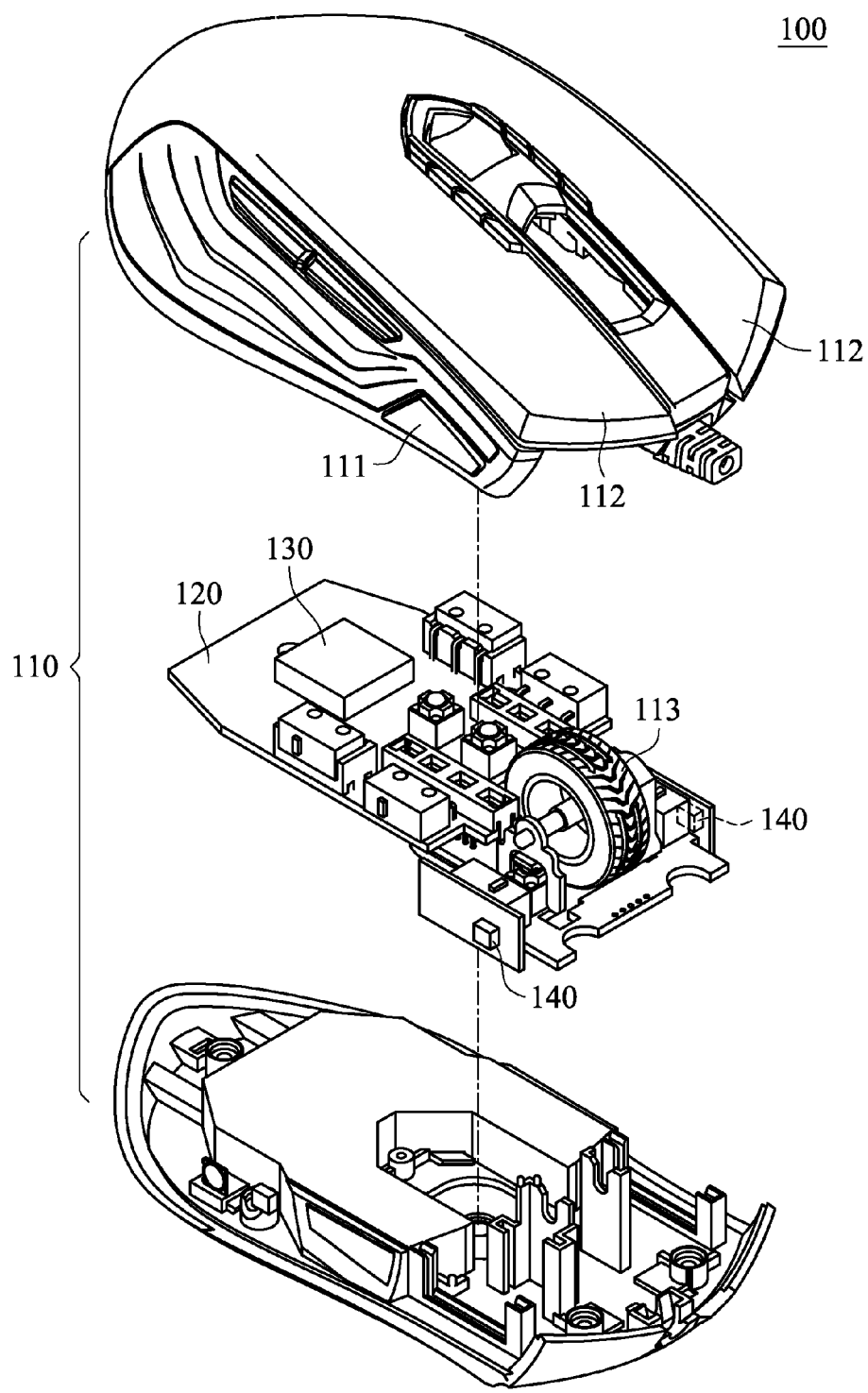
FIG. 1B is an exploded view of the computer input device according to the first embodiment.
Figure 1C:
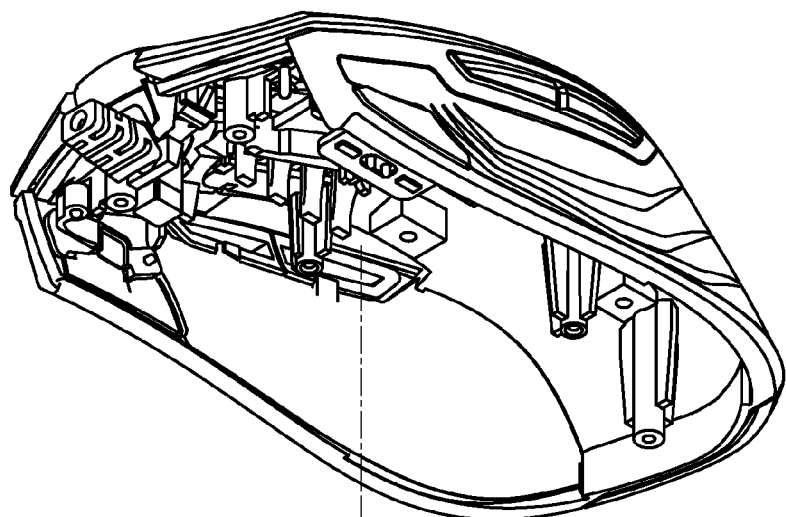
FIG. 1C is an exploded view of the computer input device according to the first embodiment.
Figure 2A:
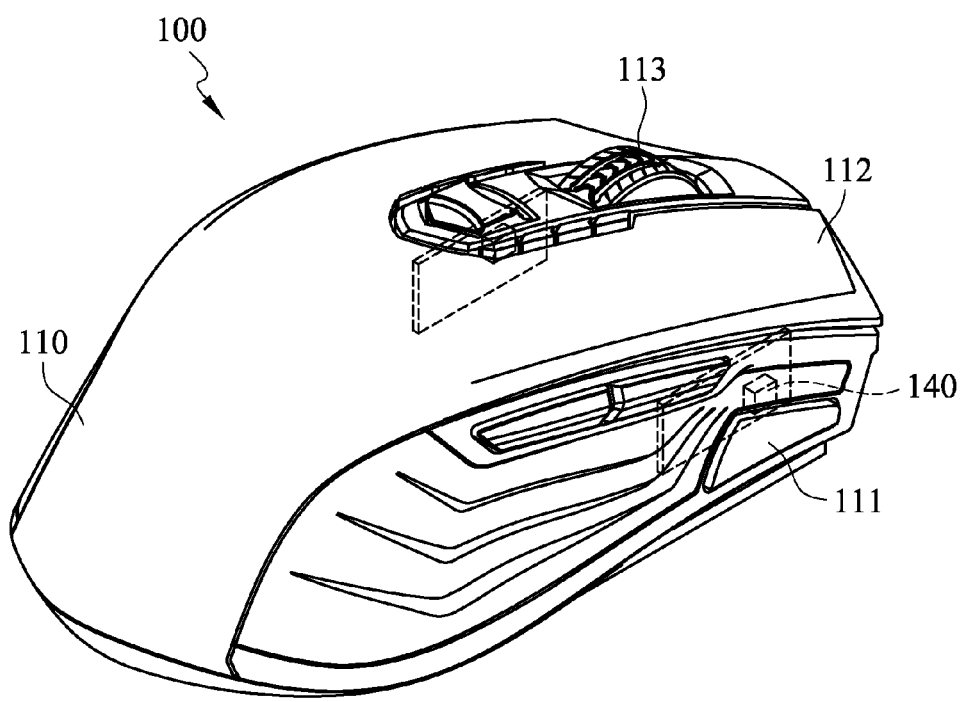
FIG. 2A is a perspective view of the computer input device according to the first embodiment.
Figure 2B:
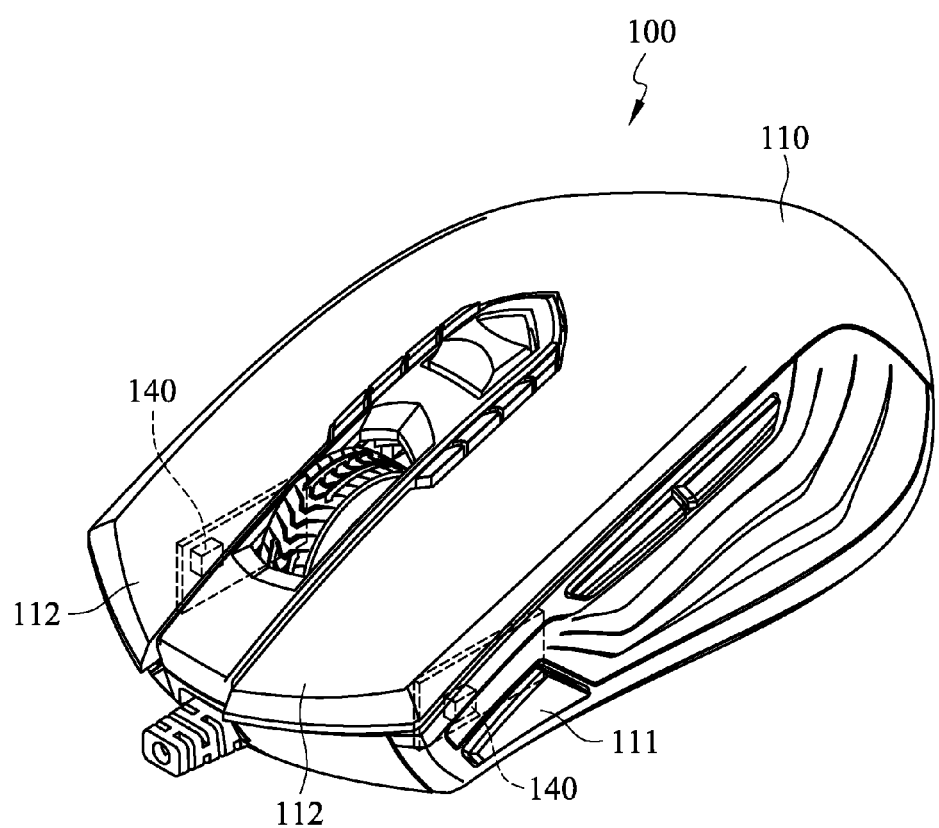
FIG. 2B is a perspective view of the computer input device according to the first embodiment.
Figure 3:
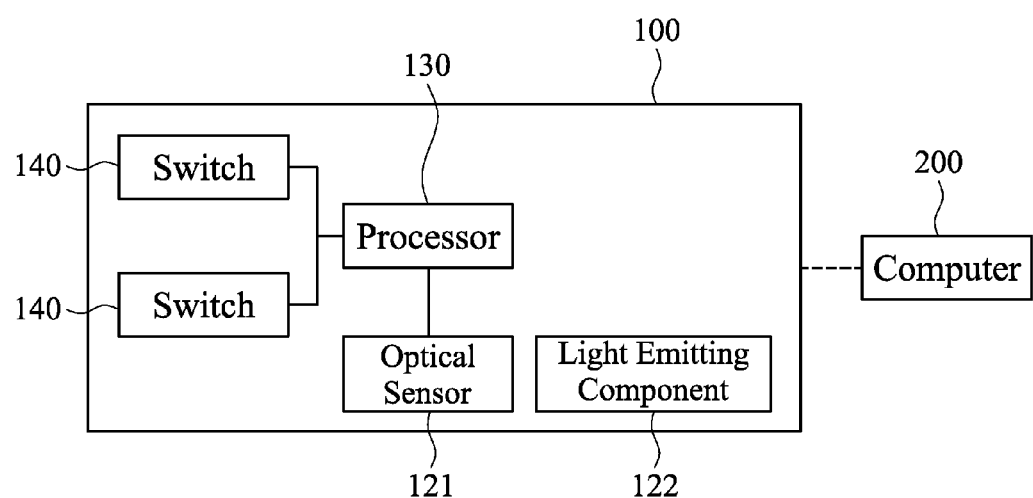
FIG. 3 is a connection diagram of the computer input device according to the first embodiment.
Figure 4:
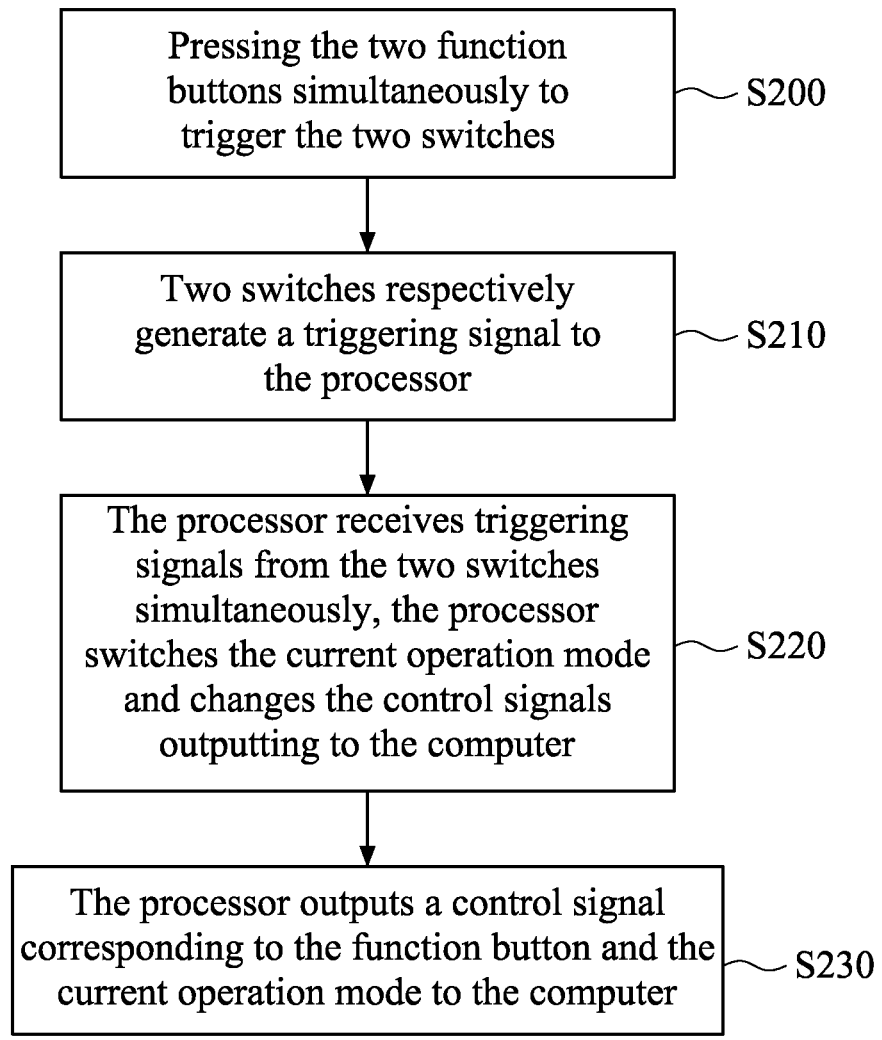
FIG. 4 is a flowchart of the mode switching method for operation modes according to the first embodiment.

Refer to FIG. 1A to FIG. 4, a computer input device 100 with switchable operation modes 100 is able to electronically connected to a computer 200, so as to execute the default function of the computer input device 100 in a operating system of the computer 200.

The computer 200 could be a desktop computer, a notebook computer, or any electronics that are able to be connected to peripheral devices, not limited as described herein. The computer input device 100 of this disclosure includes but not limits to a mouse, a trackball, a joysticks, etc. In the following description, a mouse will be the preferred embodiment. People having ordinary skill in the art can make proper modification to the computer input device 100 according to the actual needs or design requirements, not limited as described herein.

Refer to FIG. 1A to FIG. 3, the computer input device 100 includes a body 110, a PCB 120, a processor 130, and two switches 140. The body 110 has an upper and a lower casting and forms an accommodation room inside. Two function buttons 111 are disposed on the upper casting of the body 110 and able to be pressed back and forth with respect to the body 110. Two buttons 112 and a scroll wheel 113 are also disposed on the upper casting of the body 110, so as to execute the default functions of the mouse. The two function buttons 111 according to the first embodiment are disposed to the opposite sides of the upper casting. The positions of the two function buttons 111 correspond to those of the thumb and the ring finger of a user when the user uses the computer input device 100, whether a left-handed user or a right-handed user can use intuitively. The button 112 and the scroll wheel 113 are common components of mice in the prior art and have the same functions as mice in the prior art, so the inventor will not repeat here.

The PCB 120 of the computer input device 100 is disposed inside the body 110, and an optical sensor 121 and a light emitting component 122 are electronically disposed on the side facing the PCB 120 of the lower casting. The combination of the optical sensor 121 and light emitting component 122 is to optically detect the displacement distance of the computer input device 100, so as to control a cursor in the operating system by transmitting a displacement signal to the computer 200. The technology of optical displacement distance detection is a common detection technology, so the inventor will not repeat here. People having ordinary skill in the art can also choose to mechanically detect the displacement distance according to the actual needs or design requirements, not limited as described herein, and the light emitting component 122 includes but not limits to a light emitting diode or a bulb.

The processor 130 is electronically disposed on the PCB 120, and the processor 130 according to the first embodiment is a microcontroller unit, for integrating and coordinating the electrical control and actuation of the computer input device. The processor 130 outputs a first control signal corresponding to the first operation mode to the computer 200; or the processor 130 outputs a second control signal corresponding to the second operation mode to the computer 200. At the same time, the operating system in the computer 200 executes the corresponding actuations in the first operation mode or the second operation mode.

The first operation mode is suitable for right-handed users, and the second operation mode is suitable for left-handed users. When the processor 130 transmits control signals corresponding to the first operation mode to the computer 200, the operating system directly adopts the right-handed operation mode to control the cursor; when the processor 130 transmits control signals corresponding to the second operation mode to the computer 200, the operating system directly adopts the left-handed operation mode to control the cursor. That is to say, the computer 200 only needs to receive the control signals transmitted from the computer input device 100, and the operating system directly adopt the corresponding operation mode, without adjusting the setting of the mouse in the operating system. People having ordinary skill in the art can set the first operation mode as the left-handed operation mode and the second operation mode as the right-handed operation mode according to the actual needs or design requirements, not limited as described herein.

Refer to FIG. 1A to FIG. 4, the two switches 140 are disposed on the PCB 120 and are electronically connected to the processor 130. The positions of the two switches 140 respectively correspond to the positions of the two function buttons 111 on the body 110. The mode switching method for operation modes is described in the following: when users press the two function buttons 111 simultaneously, the two function buttons 111 move toward inside due to the pressings and trigger the two switches 140 (S200); meanwhile, the two switches 140 respectively generate a triggering signal to the processor 130 (S210); when the processor 130 receives triggering signals from the two switches 140 simultaneously, the processor 130 switches the current operation mode and changes the control signals outputting to the computer 200 (S220).

Specifically, when the processor 130 outputs control signals corresponding to the first operation mode, right-handed users can directly use the computer input device 100 in the right-handed operation mode of the operating system. If now a left-handed user wants to use the computer input device 100, the user can first press two function buttons 111, so as to trigger the two switches 140 to simultaneously generate and transmit the triggering signals to the processor (S200 and S210). At the same time, the processor 130 switches the first operation mode to the second operation mode and outputs control signals corresponding to the second operation mode to the computer 200 (S220). Then the operating system controls the cursor in the left-handed operation mode, such that the left-handed user can conveniently operate the computer device 200. If now the user becomes a right-handed one, the user only needs to repeats the above steps, and the computer input device 100 switches the second operation mode to the first operation mode and outputs the corresponding control signals to the computer 200.

Therefore, users only need to switch the operation modes via the computer input device 100, without adjusting the setting of the mouse in the operating system of the computer device 200. Besides, the computer input device 100 does not switch the current operation mode in the operating system, and the control signals generated by the computer input device 100 deals with the associated determination.

For avoiding accidentally pressing the function buttons 111 leading to incorrect setting, the processor 130 is set that only when the processor 130 continuously receives the triggering signals transmitted by the switches 140 over a certain time, say, at least 3 seconds, the processor 130 switches to the other operation mode. In other words, if a user presses only one function button 111, or the time that processor 130 simultaneously receives the triggering signals from the two function buttons 111 does not reach the default time, the processor 130 will not switch the current operation mode, so as to avoid accidentally pressing. People having ordinary skill in the art can extend or shorten the time that processor 130 simultaneously receives the triggering signals from the two function buttons 111 according to the actual needs or design requirements, not limited as described herein.

For better performance of the computer input device 100, the two function buttons 111 are respectively further able to execute a default function, such as the hotkey function, the macro function, or the resolution adjusting function. Specifically, when a user presses one function button 111 and triggers the corresponding switch 140, the switch 140 generates and transmits a triggering signal to the processor 130. Then the processor 130 does not switch the current operation mode, but outputs a control signal corresponding to the function button and the current operation mode to the computer 200 (S230), so as to execute the default function in the operating system. Therefore, the computer input device 100 integrates different operating functions. Except for the function button 111, the electronic signals generated by the button 112 and the scroll wheel 113 are also able to be transmitted to the computer 200 corresponding to the current operation mode by the processor 130, so as to execute the default functions.

Besides, only when the two switches 140 are continuously triggered, the processor 130 switches to the other operation mode. Therefore, the processor 130 will not accidentally switch to the other operation mode if a user presses only one function button 111.

Figure 5:
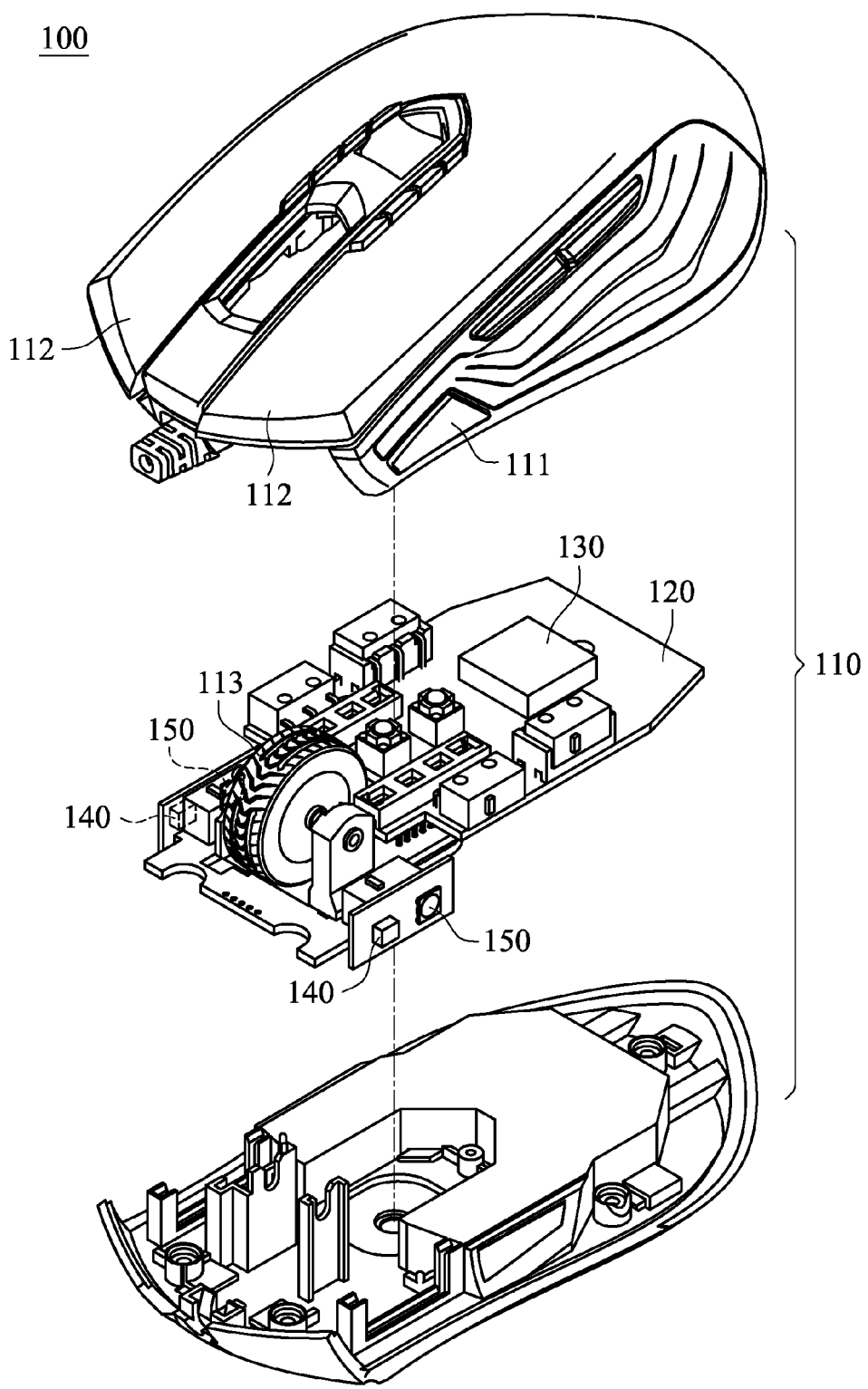
FIG. 5 is an exploded view of the computer input device according to a second embodiment.
Figure 6:
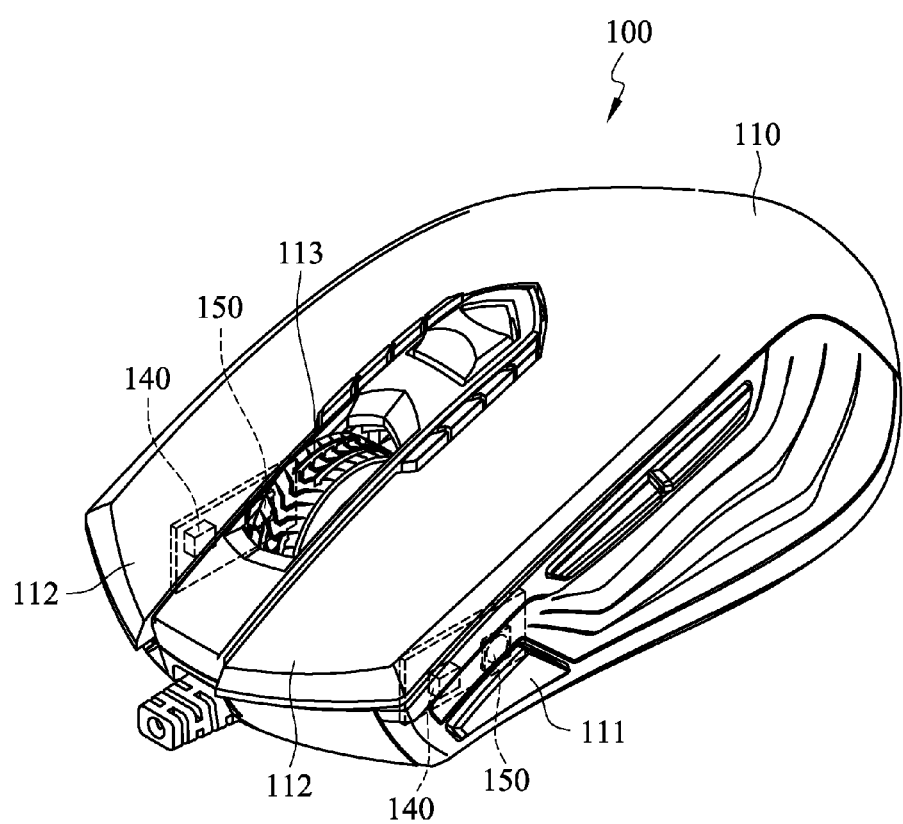
FIG. 6 is a perspective view of the computer input device according to the second embodiment.
Figure 7:
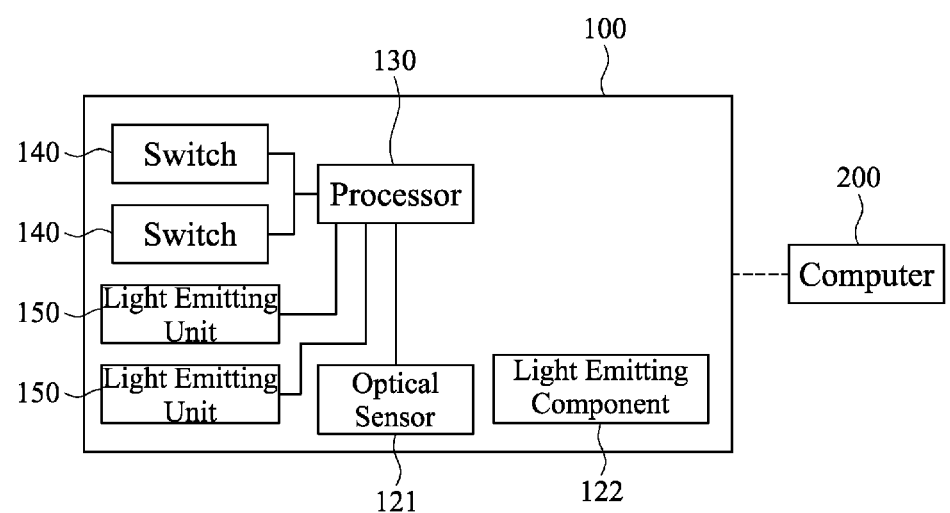
FIG. 7 is a connection diagram of the computer input device according to the second embodiment.
Figure 8:
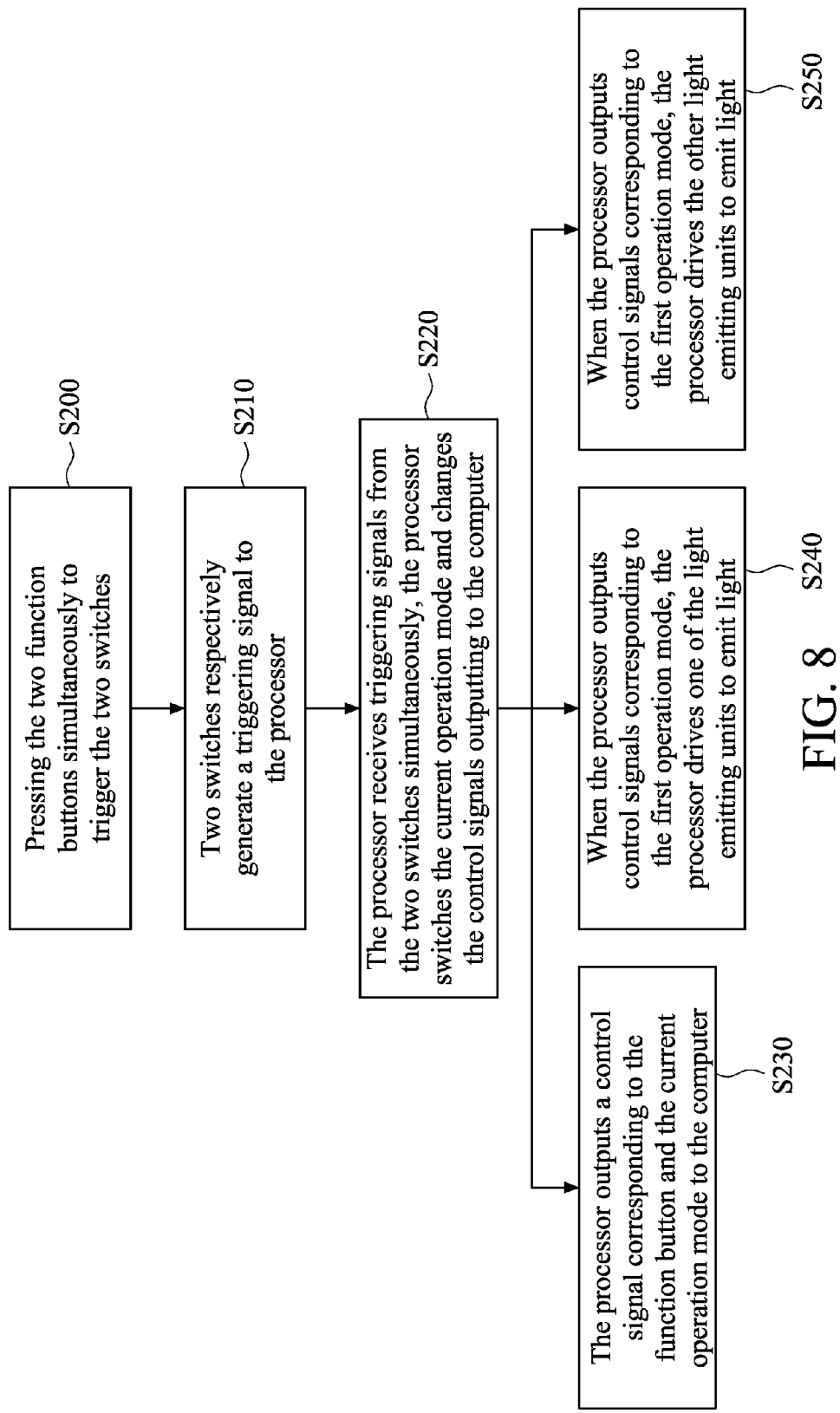
FIG. 8 is a flowchart of the mode switching method for operation modes according to the second embodiment.

Refer to FIG. 5 to FIG. 8, the components and the mode switching method of the computer input method 100 according to the second embodiment are similar to those according to the first embodiment, the inventor will describe in detail only the difference of the two embodiments.

The computer input device 100 according to the second embodiment includes a body 110, a PCB 120, a processor 13, two switches 140 and two light emitting units 150. Two function buttons 111 are disposed on the upper casting of the body 110 and able to be pressed with respect to the body 110. The PCB 120 is disposed inside the body 110, and the processor 130 and two switches 140 are disposed on and electronically connected to the PCB 120.

The two light emitting units 150 are disposed on the PCB 120 and electronically connected to the processor 130. The positions of the two light emitting units 150 respectively correspond to the two function buttons 111 on the body 110. The light emitting units 150 includes but not limits to light emitting diodes or bulbs.

The light emitting units 150 generates optical signals for representing the operation mode in which the computer input device 100 is. Specifically, the mode switching method for operation modes is described in the followings: when the processor 130 outputs control signals corresponding to the first operation mode, the processor 130 drives the light emitting unit 150 on the left side of the PCB 120 to emit light on the function button 111 on the left side of the body 110 (S240), such that the right-handed user can visually observe an optical signal on the left side of the body 110, which represents the computer input device 100 is in the right-handed operation mode; if the processor 130 outputs control signals corresponding to the second operation mode, the processor 130 drives the light emitting unit 150 on the right side of the PCB 120 to emit light on the function button 111 on the right side of the body 110 (S250), such that the left-handed user can visually observe an optical signal on the right side of the body 110, which represents the computer input device 100 is in the left-handed operation mode.

When a right-handed user uses the computer input device 100 by his right hand, most fingers of the user are on the right side of the body 110, and the user can directly observe whether the optical signal exists on the lift side of the body 110, such that the user can understand the current operation mode instantly and intuitively. If the user does not observe the light signal on the left side, the user can determine that the computer input device 100 is not in the right-handed operation mode. Then the user can press the two function buttons 111 to switch the operation mode, and the user does not need to adjust the setting of the mouse in the operating system, hence saving a lot of setting time; a left-handed user can determine the current operation mode in a similar way.

Overall, the computer input device directly control the processor to switch the operation mode, so that after receiving the triggering signal from the buttons or the function button, the processor outputs the control signal corresponding to the current operation mode, and the operating system directly executes the default functions in the operating system. Users need not to determine the current operation mode and adjust or readjust the setting of the mouse in the operating system, and the control signals transmitted by the computer input device will deal with the associated issues, increasing the convenience a lot.

Though the embodiments of this disclosure are disclosed as described above, this is not to limit this disclosure. People having ordinary skill in the art will recognize that this disclosure can be practiced with modification within the spirit and scope of the claim. It is therefore to be understood that this disclosure is not to be limited by the foregoing description but only by the appended claims.

What is claimed is:

1. A computer input device with switchable operation modes, electronically connected to a computer, comprising:
   a body, including two function buttons being pressed to move back and forth with respect to the body;
   a printed-circuit-board, disposed in the body;
   a processor, electronically connected to the printed-circuit-board, wherein the processor outputs a first control signal corresponding to a first operation mode or a second control signal corresponding to a second operation mode to the computer;
   two switches, disposed on the printed-circuit-board, respectively corresponding to the positions of the two function buttons, electrically connected to the processor, wherein while the two switches are respectively triggered by the pressing of the two function buttons, the two switches respectively generate and transmit a triggering signal to the processor; and
   two light emitting units, disposed on the printed-circuit-board, corresponding to the positions of the two function buttons, electronically connected to the processor; when the computer input device switches computer input device to the first operation mode, the processor drives one of the light emitting units to emit light, and when the computer input device switches computer input device to the second operation mode, the processor drives the other light emitting unit to emit light;

wherein when the processor receives the two triggering signals from the two switches simultaneously, the processor switches the first operation mode to the second operation mode and outputs control signals corresponding to the second operation mode to the computer; or the processor switches the second operation mode to the first operation mode and outputs control signals corresponding to the first operation mode to the computer.

2. The computer input device as claimed in claim 1, wherein the processor switches the computer input device to the first operation mode or the second operation mode after the processor continuously and simultaneously receives triggering signals from the two switches over a default time.

3. The computer input device as claimed in claim 1, wherein when the processor receives a triggering signal from one of the switches, the processor outputs a control signal corresponding to the current operation mode to the computer.

4. The computer input device as claimed in claim 1, wherein the two function buttons are respectively disposed to the two opposite side surfaces of the body.

5. The computer input device as claimed in claim 1, wherein the first operation mode is for left-handed users, and the second operation mode is for the right-handed users.

6. A mode switching method, applying to a computer input device for switching operation modes, comprising the steps of:

pressing two function buttons simultaneously, so as to trigger two switches;

generating and transmitting a triggering signal to a processor via the two switches respectively; and receiving the two triggering signals via the processor simultaneously, and then switching the computer input device to a first operation mode and outputting a control signal corresponding to the first operation mode to a computer via the processor, and driving one light emitting unit to emit light via the processor; or switching the computer to a second operation mode and outputting a control signal corresponding to the second operation mode to the computer via the processor, and driving another light emitting unit to emit light via the processor.

7. The mode switching method as claimed in claim 6, wherein in the step of receiving the two triggering signals via the processor simultaneously, switching the computer input device to the first operation mode or the second operation mode is only executed after the processor continuously receives the two triggering signals over a default time.

8. The mode switching method as claimed in claim 6, further including the step of:

receiving one of the triggering signal via the processor, so as to output a control signal corresponding to the current operation mode to the computer.

\* \* \* \* \*